Dec. 3, 1963 E. J. VOLMERT 3,112,804
BEARING STRUCTURE
Filed Feb. 23, 1962 2 Sheets-Sheet 1

Elmer J. Volmert
INVENTOR.

BY
ATTORNEYS

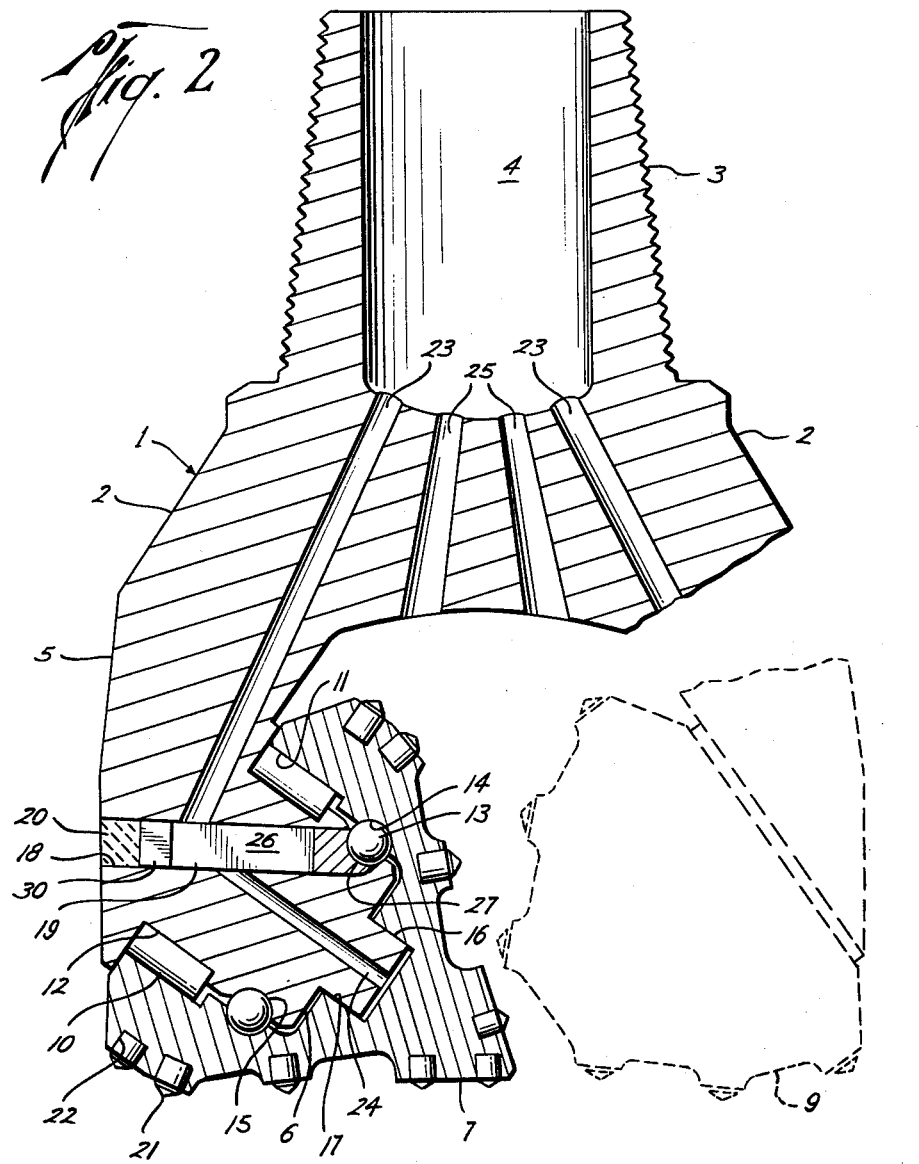

United States Patent Office 3,112,804
Patented Dec. 3, 1963

3,112,804
BEARING STRUCTURE
Elmer J. Volmert, Houston, Tex., assignor to Reed Roller Bit Company, Houston, Tex., a corporation of Texas
Filed Feb. 23, 1962, Ser. No. 175,078
6 Claims. (Cl. 175—371)

This invention relates generally to deep well roller cutter drill bits and more particularly to such drill bits wherein a percussion tool or hammer is used in conjunction therewith.

It is an object of this invention to provide a new and improved drill bit for use in percussion drilling.

Another object is to provide a new and improved roller drill bit having antifriction bearings employed therein, and improved means for retention of such bearings within the drill bit roller cutters.

Another object is to provide a new and improved ball bearing retaining pin for a roller drill bit.

Another object is to provide a bearing retaining pin for roller bit cutters which will alleviate failures of the pin which may be caused by vibrations of the drilling bit during the drilling operation.

Other objects will become apparent from the following description and accompanying drawings, in which:

FIG. 2 is a longitudinal sectional view of the drill bit taken along line 2—2 in FIG. 1.

Figure 1:
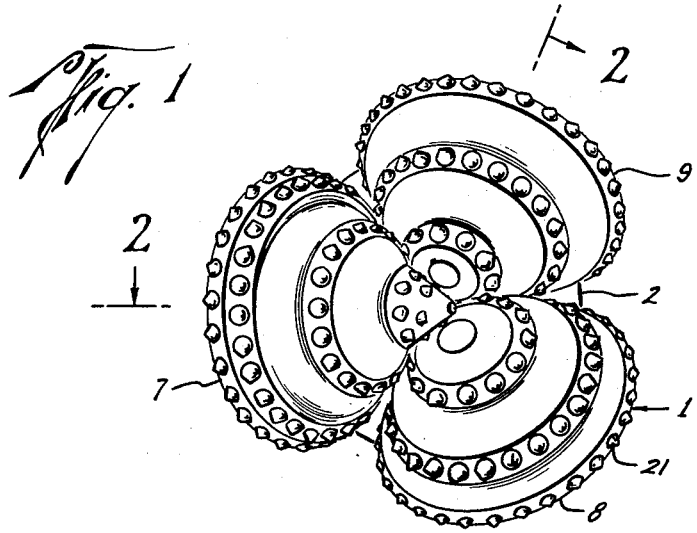
FIG. 1 is a bottom plan view of a cone type roller drill bit employing tungsten carbide inserts as cutting elements.

In the drawings, a drill bit is shown generally at 1 comprising a bit head 2 and a threaded shank 3 extending upwardly from the bit head 2 for attachment to the lower end of a drill stem (not shown). The threaded shank 3 has a chamber 4 therein for the reception of drilling fluid.

The bit head 2 has a plurality of downwardly extending legs 5. Each of the legs 5 has an inwardly and downwardly extending shaft 6 thereon. Roller cutters 7, 8 and 9 are rotatably mounted on the shafts 6.

Suitable antifriction bearings are provided between the shaft 6 and the bore of the cutter 7 comprising a set of roller bearings 10, engaging raceways 11 and 12 in the cutter 7 and on the shaft 6 respectively. Ball bearings 13 are positioned in complemental raceways 14 in the cutter 7 and 15 on the shaft 6. A friction bearing 16 is provided on the inner end of the shaft 6 to engage with a friction bore 17 in the cutter 7.

The ball bearings 13 are inserted into the raceways 14 and 15 through a straight cylindrical bore 18 extending through the leg 5 and the shaft 6. After a full complement of ball bearings 13 is inserted into the raceways 14 and 15, a steel bearing retaining pin 19 is inserted into the bore 18, and secured in place with weld metal 20. The diameter of the pin 19 is slightly smaller than the diameter of the bore 18. An inner end 27 of the pin 19 is contoured to form part of the race 15.

The cutters 7, 8 and 9 may be made of steel, and may have tungsten carbide cutting elements 21 which may be secured in the cutters by press fitting the elements 21 into sockets 22 of the cutters. If desired, the cutters may employ conventional steel teeth (not shown) instead of the tungsten carbide cutting elements 21.

The bit head 2 and the legs 5 have fluid passageways 23 extending downwardly therethrough to intersect the bore 18 in the shaft 6. The shaft 6 may have a passageway 24 which extends longitudinally of the shaft 6 to intersect the bore 18. The upper end of the passageway 23 communicates with the chamber 4 of the threaded shank 3.

The bit head 2 may have additional passageways 25 communicating between the chamber 4 and the exterior of the bit.

Figures 3, 4:
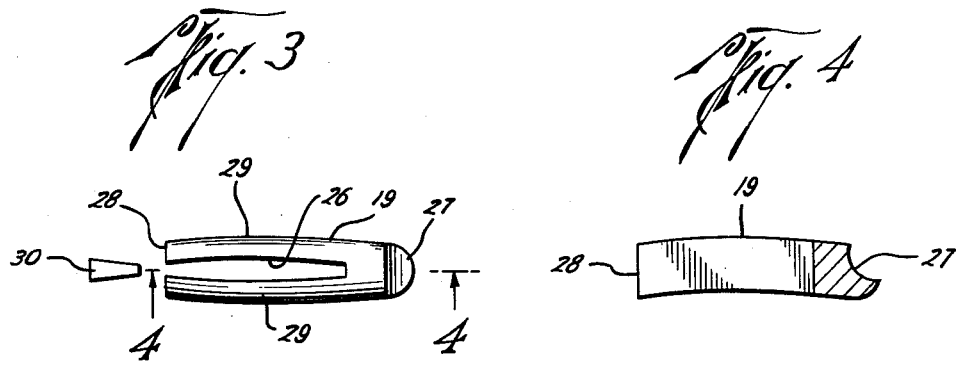
FIG. 3 is a detail plan view of a ball bearing retaining pin of the type shown in FIG. 2.
FIG. 4 is a longitudinal sectional view of the pin taken along line 4—4 in FIG. 3.

The steel pin 19 may have a vertical slot 26 therethrough extending from the outboard end 28 thereof for a substantial axial distance inwardly thereof, as shown in FIGS. 2, 3, and 4. The slot 26 serves to establish communication between the passageways 23 and 24 whereby drilling fluid may be supplied from the chamber 4 into the interior of the cutter 7, in order to clean, cool and lubricate the interior of the cutter 7, the attendant parts and the bearings during drilling operations.

During drilling operations, the bit is connected to the lower end of a drill stem (not shown) which is lowered and rotated to cause the roller cutters to roll upon the bottom of a borehole to thereby cut or crush the formation being encountered. A drilling fluid such as air or mud is pumped downwardly through the drill stem and bit and rises upwardly in the annular space between the drill stem and the wall of the hole to the surface of the earth to remove the cut or crushed particles of formation from the bottom of the hole and from the areas around the roller cutters and the bit head, and to cool and clean the drilling bit.

A vibrating tool or a conventional percussion hammer may be employed in conjunction with the drill bit to supply vibrations and impacts to the drill bit to enhance its progress through the earth formations. Such a percussion tool may be of the type shown in the U.S. Patent No. 2,750,154 issued June 12, 1956, to E. G. Boice.

During such drilling operations, particularly when the percussion hammer is employed, the drill bit is subjected to severe vibrations.

At times such vibrations cause the ball retaining pin 19 to enlarge the bore 18 of the shaft 6 or cause the pin 19 to become reduced in diameter as a result of the pin 19 contacting and vibrating against the wall of the bore 18. In such cases, the pin 19 may fail or break due to fatigue, or the weld 20 which is secured to the outboard end of the pin 19 may fail, or both may fail, and the weld 20 and the pin 19 and bearings 13 may become lost from the bit causing premature failure of the drill bit. The pin 19, thus broken, may also rotate about its axis and cause its contoured inner end 27 to become misaligned with the race 15, and thereby interfere with the circulation of the ball bearings 13 about such race which action may damage or break the balls 13 or the races 14 and 15, and may cause the cutter 7 to cease to rotate about the shaft 6, so as to cause failure of the drill bit.

In actual percussion drilling operations, I have alleviated such failures by providing a new and improved ball retaining pin such as pin 19 which, as it is installed within the bore 18, will be preloaded to a stress level higher than that imposed on the pin 19 by such drilling operations.

Before installation into the bore 18, the pin 19 is provided with a slot 26 extending vertically therethrough and inwardly for a substantial axial distance from the outer end 28 of the pin 19. The sides 29 of the pin 19 are deformed as by bowing them radially outwardly from the centerline of the slot 26, in a horizontal plane, as shown in FIG. 3. In addition, the pin 19 may be bent in a vertical plane, as shown in FIG. 4. Thus as the pin 19 is installed within the straight cylindrical bore 18 of the shaft 6, the pin is forced into substantial conformation with the size and direction of the bore 18. A wedge 30 may then be driven into the outboard portion of the slot 26 to further tighten the pin 19 in the bore 18, and the wedge 30 and the pin 19 may be secured to each other and to the leg 5 by the weld 20. Thus the pin 19 is highly stressed when installed into the position shown in FIG. 2.

Figure 5:
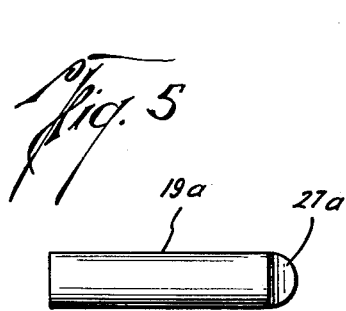
FIG. 5 is a plan view of a modification of the ball bearing retaining plug.
Figure 6:
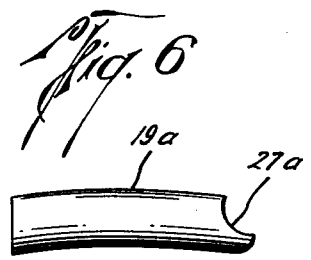
FIG. 6 is a side view of the pin shown in FIG. 5.

If it is desired that drilling fluid not be supplied to the interiors of the cutters, or if passageways which do not intersect the bore 18 are provided to supply the interiors of the cutters, then the steel pin 19a shown by FIGS. 5 and 6 may be employed.

The pin 19a is solid and has a diameter slightly smaller than the diameter of the bore 18, and has its inner end contoured as at 27a, to align with the ball bearing race 15 on the shaft 6.

Before being installed into the bore 18, the pin 19a is deformed as by bending it in a vertical plane as shown in FIG. 6. As the pin 19a is installed into the bore 18, the pin 19a is substantially straightened to conform with the bore 18 with the result that the pin 19a is preloaded to a high stress level when it is in operating position. The pin 19a may be secured in place in the bore 18 by welding as previously described.

This invention is not limited to the embodiments shown. Various changes within the scope of the following claims will occur to those skilled in the art.

I claim:

1. In a well drill, a head having a drilling fluid chamber therein and a downwardly extending leg thereon, an inwardly extending shaft on said leg, a roller cutter on said shaft, complementary raceways on said shaft and in said cutter, antifriction bearings in said raceways, said shaft having a bore extending to said shaft raceway, said head and leg having a passageway extending from said fluid chamber to intersect said bore, said shaft having an axial passageway intersecting said bore, a bearing retaining pin in said bore, said pin having a slot therethrough extending from the outboard end of said pin a substantial axial distance inwardly thereof, said slot adapted to establish communication between the said two passageways, the said pin being initially bent in a vertical plane, and the sides thereof being bowed outwardly in a horizontal plane from the centerline of said slot to effect stressing of the pin when it is installed in said bore, a wedge adapted to be driven into the outboard end of said slot, and weld material securing the end of the pin and the wedge to each other and to the bit leg.

2. In a well drill, a head having a downwardly extending leg thereon, an inwardly extending shaft on said leg, a roller cutter on said shaft, complementary raceways on said shaft and in said cutter, antifriction bearings in said raceways, said shaft having a bore extending to said shaft raceway, a bearing retaining pin in said bore, said pin having a slot therethrough extending from the outboard end of said pin a substantial axial distance inwardly thereof, the said pin being initially bent in a vertical plane, and the sides thereof being bowed outwardly in a horizontal plane from the centerline of said slot to effect stressing of the pin when it is installed in said bore, and weld material securing the pin to the bit leg.

3. In a well drill, a head having a downwardly extending leg thereon, an inwardly extending shaft on said leg, a roller cutter on said shaft, complementary raceways on said shaft and in said cutter, antifriction bearings in said raceways, said shaft having a bore extending to said shaft raceway, a cylindrical bearing retaining pin in said bore, said pin having a slot therethrough extending from the outboard end of said pin a substantial axial distance inwardly thereof, the said pin being initially bent to effect stressing of the pin as it is installed in said bore and weld material securing the pin to the bit leg.

4. In a well drill, a head having a downwardly extending leg thereon, an inwardly extending shaft on said leg, a roller cutter on said shaft, complementary raceways on said shaft and in said roller cutter, ball bearings in said raceways, said shaft having a bore extending from said shaft raceway to the outer surface of said leg, a cylindrical bearing retaining pin adapted to be inserted into said bore, and being initially contoured to effect stressing thereof as it is inserted into said bore, and means securing the pin in said bore.

5. In a well drill, a head having a downwardly extending leg thereon, an inwardly extending shaft on said leg, a roller cutter on said shaft, complementary raceways on said shaft and in said roller cutter, ball bearings in said raceways, said shaft having a bore extending from said shaft raceway to the outer surface of said leg, a cylindrical bearing retaining pin adapted to be inserted into said bore, and being contoured to effect stressing thereof as it is inserted into said bore.

6. A well drill according to claim 5 wherein the cylindrical bearing retaining pin is split and bowed.

References Cited in the file of this patent
UNITED STATES PATENTS

| | | |
|---|---|---|
| 1,798,273 | Pleister | Mar. 31, 1931 |
| 1,830,460 | Berge | Nov. 3, 1931 |
| 1,989,018 | Norwood | Jan. 22, 1935 |
| 2,038,387 | Scott | Apr. 21, 1936 |
| 2,361,107 | Johnson | Oct. 24, 1944 |
| 2,661,932 | Woods | Dec. 8, 1953 |
| 2,880,970 | Swart | Apr. 7, 1959 |
| 2,982,367 | Kucera | May 2, 1961 |